March 8, 1932.  E. G. T. GUSTAFSSON  1,848,710
PROCESS FOR PRODUCING METAL SPONGE
Filed Jan. 15, 1929  2 Sheets-Sheet 1
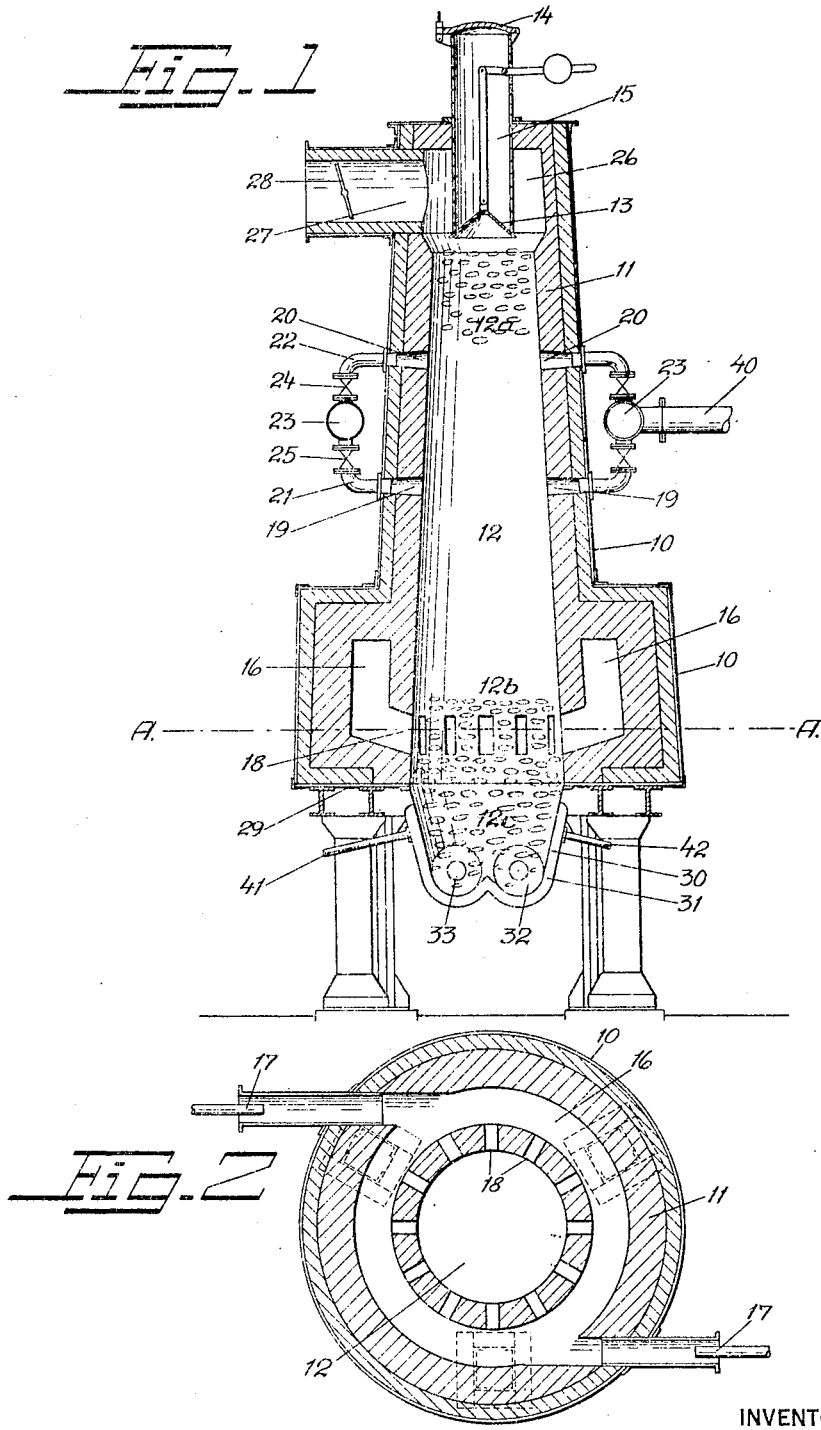
INVENTOR
Emil G. T. Gustafsson.

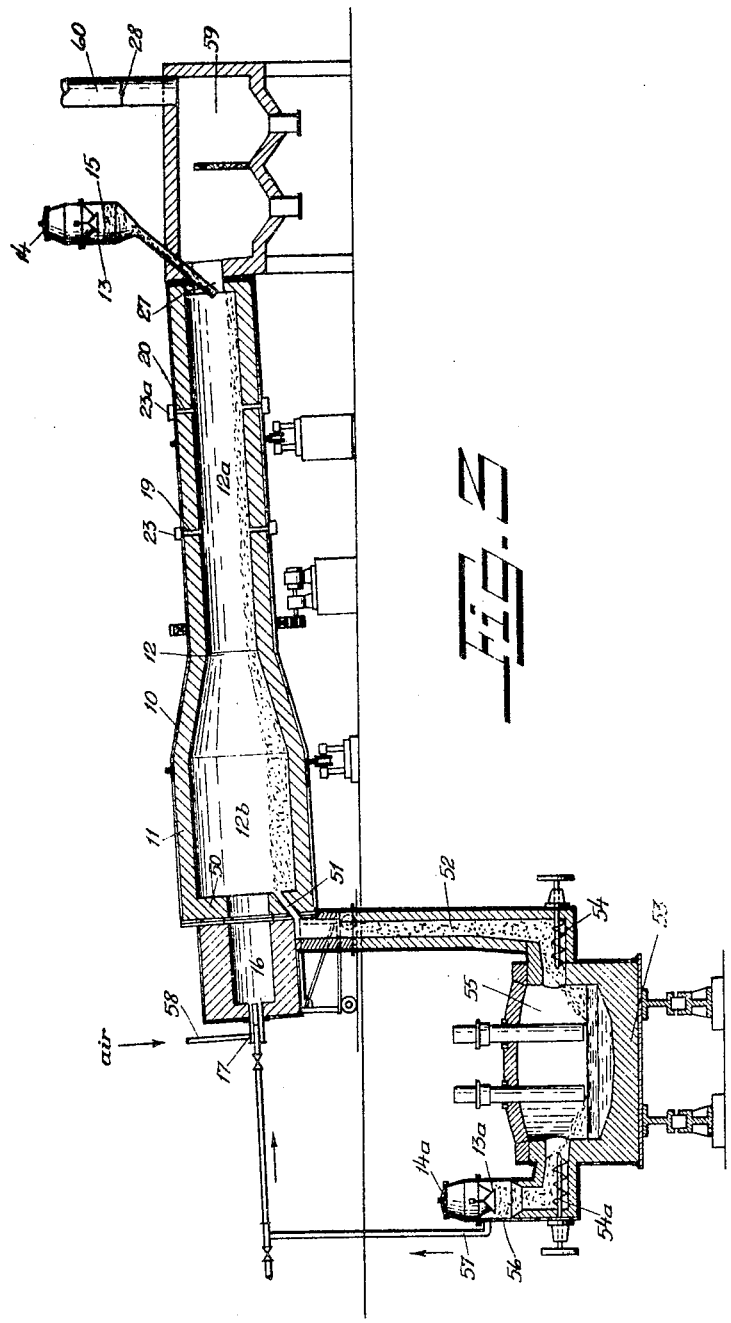

Patented Mar. 8, 1932

1,848,710

UNITED STATES PATENT OFFICE

EMIL GUSTAF TORVALD GUSTAFSSON, OF STOCKHOLM, SWEDEN

PROCESS FOR PRODUCING METAL SPONGE

Application filed January 15, 1929, Serial No. 332,748, and in Sweden November 28, 1928.

My present invention relates to a process for producing metals in a spongy state, for instance iron sponge, cobalt sponge, nickel sponge, chrome sponge and chrome-iron sponge, from their oxide ores or other metal oxide containing material, without fusing the metal during the reduction.

It is known to produce iron sponge by heating in a rotary furnace a fine-grained mixture of iron ore and carbonaceous material through the combustion of gas, oil or powdered coal in the furnace. It has, however, been proven, that, in spite of a great excess of carbon being used in the mixture relatively to the amount required for the reduction of the ore, this process has had the drawback that the ore will separate from the coal and stick to the furnace wall and aggregate on the same, so that the operation of the furnace will be rendered impossible or, at least, extremely difficult.

The main object of my present invention is to overcome this drawback and, thus, render the process technically and commercially practicable.

In order to attain this, the ore is according to the present invention intimately mixed with a reducing agent and, if desired, a suitable binding agent, the reducing agent being added in excess of the theoretical amount required for the reduction of the ore, and the mixture is transformed into briquettes or other form of pieces with the particles of the ore and of the reducing agent fixed in their relative positions, whereafter the briquettes are reduced in a reduction furnace surrounded by an atmosphere containing combustion gases, said gases being developed, for instance, through combustion of oil, gas or solid fuel in the furnace room where the reduction takes place.

Briquetting only, without using an excess of reducing agent in the mixture, will not give the desired result—a metallic, unfused product of a high degree of reduction—as in such case a reoxidation of reduced metal must take place at the end of the process, especially at the surfaces of the reduced briquettes, caused by the briquettes coming into contact with an oxidizing atmosphere.

Thus, if briquettes without an excess of reducing agent are treated in the manner as previously described, the result will be that a spongy metal is obtained, but the metal will have a low degree of reduction and will, thus, not come up to the required standard of metal sponge. Neither will an excess of reducing agent only, without briquetting of the charge, give the desired result. The conditions for a successful carrying out of the process are, consequently, first that the mixture to be reduced contains an excess of reducing agent, and second that said mixture is reduced in a briquetted state.

Reducing agents which by reaction with the ore will form gaseous combustible products are most suited for the process, such as carbonaceous materials, for instance charcoal, carbocoal, peat coke, bituminous coal, anthracite or coke. The distillation products, carbon monoxide, methane and hydrogen, developed from the carbonaceous material when heating the briquettes, and the gas formed in reduction of the ore, mainly consisting of carbon monoxide, are thereby combusted, wholly or partly, in the furnace both outside of the briquettes in the surrounding atmosphere and to a minor part within the briquettes proper, the combustion caused by air or by the oxidizing constituents of combustion gases, especially supplied to or developed in the furnace through combustion of added fuel. Hereby the supply of heat to the ore and the reducing material is highly facilitated. Other reducing agents, for instance thermic agents such as ferro-silicon, ferro-aluminium, ferro-aluminium-silicon and aluminium, may, however, wholly or partly, replace the carbonaceous material.

The briquetted state of the charge and the use of an excess of reducing agent in same give the advantage that in heating for reduction each ore particle will always have the reducing agent required for its complete reduction in its immediate proximity and fixed together with it. Therefore, separation of the ore from the reducing agent and thereby aggregating of ore on the walls of the furnace cannot take place as is the case when loose charge is used. Towards the end of the reduction when, if an excess of reducing agent is not at hand, a reoxidation of reduced metal will take place through the contact with the combustion gases containing carbon dioxide and, in some cases, water vapour and/or oxygen, the excess of reducing agent prevents such reoxidation, because the carbon dioxide and oxygen react with the reducing agent until the reducing and the oxidizing constituents of the gases will become neutral in regard to the charge.

If the reducing agent consists, wholly or partly, of carbonaceous material, carbon monoxide will during reduction be developed in the briquettes, filling the pores of the briquettes and partly also surrounding same with a reducing atmosphere. The carbon dioxide formed by combustion above or around the briquettes has, on account of the over-pressure of the carbon monoxide within the briquettes, a relatively small capacity to penetrate directly into same. At the surfaces of the briquettes, naturally, the contact with the carbon dioxide will be more intimate, causing a greater consumption of reducing agent by reaction with the carbon dioxide. If the excess of reducing agent in the mixture is made sufficiently great, the risk of reoxidation of the metal at the surfaces of the briquettes will be very small. Suitably, the distribution of the reducing agent in the briquettes or pieces may be adapted in such a manner, that an excess of same only is at hand in or on the surfaces of the briquettes or that the excess is there greater than in the other parts of the briquettes. This excess of reducing agent in or on the surfaces may, for instance, be accomplished by powdering the fresh-formed, moist briquettes with reducing agent or by rolling the same in pulverized reducing agent, for instance powdered coal, or by using mixtures of different compositions in the different layers of the briquettes.

The supply of heat to the charge for the reduction is highly facilitated by the briquetted state of same. Between the briquettes interspaces are formed in the charge in which the combustion gases make their way and, thus, surround the briquettes. In these spaces also combustion of gas developed by reduction will occur. Therefore, all briquettes will be supplied with heat and each act as a reaction centre. The smaller the size of the briquettes, the better will from this point of view the supply of heat be to each individual briquette of the charge. However, this holds true only to a certain limit, as the interspaces between the briquettes also will decrease with decreased size of the briquettes, and thereby the difficulty increases for the combustion gases to make their way between the briquettes. In using a charge in a loose form in a rotary furnace as in the known process, only the upper surface of the charge and the contact surface with the heated furnace wall will be supplied with heat. In using briquettes, on the contrary, the combustion gases can on account of the great porosity of the briquettes easily penetrate into the interior of the briquettes either directly or by diffusion and supply the required heat, at least during the time when the development of gas in the briquettes is not very active.

On account of the ore and the reducing agent being used in finely divided state and through the ample supply of heat, the reduction takes place very quickly in the briquettes. The finer the grains are graded, the more quickly and the more completely will the reaction take place on account of the constituents coming into closer contact with each other. As a rule a grading to less than 100 meshes or still better 200 meshes per $cm^2$ will be sufficient. However, larger sizes, if so desired, can be used. The other important factor for good reduction is the porosity of the briquettes. The porosity depends upon the pressure used in the briquetting or other forms of transformation into pieces. The lower the pressure, the more porous will be the briquettes. The briquettes are therefore preferably prepared with a so-called spurt press at a low pressure of, for instance, about 10 $kg/cm^2$ or still lower, or by nodulizing.

The reduction can also be facilitated and the reoxidation of the reduced metal be rendered more difficult by controlling the quantity of air supplied to the furnace where the reduction is carried out in such a manner that an atmosphere which is not in too great extent oxidizing or so-called reducing is formed in the furnace. The air should thereby be supplied in a quantity less than the theoretical amount required for complete oxidation of the combustible elements of the fuel which is either supplied from outside or produced from or existing in the charge in the furnace. Thus, the combustion can be controlled so that the combustion gases can contain carbon monoxide in a desired proportion The quantity of from outside added fuel required will hereby, certainly, be greater, but on the other hand the reduction will be more easily and more completely performed. The loss of heat by incomplete combustion is, however, not of any importance, as these unburnt constituents can be utilized in the preliminary operations in the furnace, for instance for pre-heating and/or drying of the charge.

The greater the excess of reducing agent is in the briquettes, of the less importance is, naturally, the nature of the combustion gases in the furnace. A highly oxidizing flame in the furnace will, naturally, at the great excess of carbon in the charge burn part of the carbon in same until the necessary equilibrium in the oxygen pressure of the solid phase and that of the gaseous phase will be obtained. However, the combustion of carbon in the briquettes will readily be uneven and can therefore in some cases be disadvantageous to the process.

A relatively high excess of carbon or other reducing agent in the briquettes is of the advantage that the ore grains and the metal grains, respectively, are prevented from sintering too hard to each other. If the reduced briquettes containing metal sponge are not to be directly used as they are, then they can easily be disintegrated by crushing or the like for the removal of remaining reducing agent and, if desired, gangue and binding agent. This removal should suitably be carried out by known concentrating methods, for instance dry or wet magnetic separation, wind separation, washing in water or classifying according to the specific weight or the like. The concentrated, pulverous metal is thereafter, if it should be transported or if suitable from other points of view, subjected to a pressing into briquettes or the like, in order to decrease its volume and its oxidation when melted. By such a concentration of the product it is possible to use for the process comparatively poor ore which otherwise would give a product too poor in metal and too rich in gangue.

The suitable amount of reducing agent in excess in the briquettes or in their surfaces, respectively, should in each case be determined through practical tests. It depends, as previously mentioned, inter alia, intimately upon the manner of combustion in the furnace, so that the more oxidizing the combustion is kept, the greater should be the excess. When the combustion is carefully controlled and the supply of air is properly distributed in the furnace an excess of about 5%, in certain cases down to 1%, may be sufficient. Especially when using thermic reducing agent, the excess may be kept comparatively small because most of the heat, required for carrying out the process, will be supplied through the reaction between the thermic agent and the ore. Generally, however, an excess of at least 10% is advisable, but if cheap grades of coal are used as reducing agent an excess of 50% up to 100% or higher may be suitable. By concentration of the product a tailing rich in carbon is thereby obtained which advantageously may be used again as reducing agent in the process, if desired after separation of the gangue from the same. If not too high demands are put on the degree of reduction in the final product, for instance if it should be further reduced in an electric furnace or the like, a comparatively small excess of reducing agent can be used.

As binding agent in the briquetting any suitable binding agent may be used, but most suitable are carbonaceous or calciferous materials which are in or can be brought into liquid state, so that they can be intimately admixed with the ore and the reducing agent and by drying or heating converted into solid state and bind the different grains to each other. Carbonaceous binding material, for instance pitch, tar or molasses, supplies reducing agent to the mixture and can therefore suitably form the excess of reducing agent in the briquettes. If a calciferous binding agent, for instance lime-white, is used, it will in heating the briquettes in the furnace for the reduction combine with and bind a considerable part of the sulphur content of the ore and the reducing agent. This bound sulphur can be removed, for instance, through magnetic separation of the product.

In carrying out the present process any suitable type of furnace may be used without the invention being dependent thereupon. Rotary furnaces or shaft furnaces are, however, preferable. Which type of furnace shall be used in each case depends upon the size of the briquettes used and upon the purpose for which the metal sponge will be used. If the sponge will immediately be transferred to a melting furnace, for instance an electric furnace, and not too small-sized briquettes are used, the production of the sponge is preferably carried out in a reduction shaft furnace. This furnace may be combined with a melting furnace or form a feeding shaft to such a furnace. In such case the additional fuel, required in the reduction furnace, may advantageously be taken from the melting furnace in form of gas, said gas being obtained, for instance, by reducing and melting in same of remaining unreduced ore in the briquettes coming from the reduction furnace. In some cases it will be to advantage to feed into the melting furnace a separate charge containing oxide ore and reducing agent, if desired in a briquetted state, in order to increase the supply of additional fuel to the reduction furnace. The reducing agent in said charge may thereby, preferably, be kept in shortness of the theoretical amount required for reduction of the ore in the charge, in order to compensate the excess of reducing agent supplied with the briquettes from the reduction furnace. Evidently, a rotary furnace may be used in such a case instead of a shaft furnace, especially if briquettes of small size are used. The operation of the furnaces used may be continuous or intermittent as desired.

Rotary furnaces are, as mentioned before, especially suitable when charges in form of small-sized briquettes are used, for instance of a size not exceeding that of beams, which may be produced by nodulizing of the ore-reducing agent-mixture and thereafter drying of the nodules. The combustion of extra added fuel—gas, oil or powdered coal—is in such a furnace preferably accomplished by the aid of a burner placed at the discharging end of the furnace, for instance in centre of same, or in a special combustion chamber before the furnace, whereat the supply of air is controlled in such way that also the gas that may be formed in the reduction will be, wholly or partly, combusted. The heat will thereby be supplied to the briquettes from flames or by hot combustion gases sweeping over the charge in the furnace and also making their way into the interspaces between the briquettes. With large briquettes in rotary furnaces a crushing of the briquettes against one another will easily take place at the revolving of the furnace, so that a relatively large quantity of dust of ore and reducing agent is formed and which is to a considerable part carried away by the combustion gases.

The charge may, preferably, be treated in different sections of a rotary furnace, built together or in other way connected to each other, of diameters and lengths suited to the length of time in which the charge shall be kept in each section. In one or more of the sections the charge is thereby pre-heated to the reduction temperature which, for instance, for iron lies at about 850°–950° C. The heat consumption for the pre-heating amounts thereby for iron sponge to about half of the total heat consumed in the production. In one of these sections also drying of the more or less moist, perhaps fresh-formed briquettes may be carried out by the aid of the hot combustion gases coming from the reduction section, which gases advantageously also may be used for pre-heating of the combustion air to the furnace. In the last section of the furnace, which is preferably in known manner built with larger diameter than the other sections, the reduction of the pre-heated and, in some cases, to some degree pre-reduced charge is performed. In the drying section and the pre-heating section, respectively, the gas coming from the reduction section and containing combustible constituents may preferably be completely burnt with air, supplied at one or more places of the furnace, as the reaction between the carbon dioxide and the other oxidizing constituents in the combustion gases and the carbon in the briquettes is very slow and unconsiderable at temperatures below 800° C. By supplying in this manner the combustion air successively to the furnace, the oxidizing constituents in the combustion gases will be proportionate to the oxygen in the charge which the gases come in contact with.

Shaft furnaces are not quite suitable for small-sized briquettes because it is difficult for the gases to force their way between the briquettes, if not special arrangements are made for facilitating the conducting of the gases, which latter, however, would make the furnace construction complicated. Therefore, the briquettes should in this type of furnace preferably be of the size of walnuts or larger. The shaft furnaces may, as the rotary furnaces, suitably be provided with special combustion chambers for additional fuel, if such is required, from which the flames or the hot combustion gases flow into the shaft furnace and surround the briquettes. The furnaces should also suitably be provided with several entrances for combustion air, placed on different levels in the furnace, so that the gases can be successively utilized during their passage upwards through the shaft. In this manner there will, as mentioned before, exist different zones in the furnace with different contents of carbon dioxide or other oxidizing gases in relation to the stage of oxidation in which the ore and the metal, respectively, are in the shaft. In this way there is obtained in the furnace a zone of pre-heating and a reducing zone. If the briquettes are supplied in a moist state to the furnace a preliminary drying zone can be arranged. If the hot sponge is not to be used in another furnace or the like, a cooling-zone can be arranged in the lower part of the furnace or in some other way. Evidently, the furnace can be divided in several sections separated from one another, if it should be suitable for a better control of the process.

In the accompanying drawings there are shown by way of example but by no means in limitation of the invention apparatus suitable for carrying out the invention.

Fig. 1 is a vertical section through a shaft furnace provided with a special cooling chamber, Fig. 2 being a cross-section on line A—A of Fig. 1.

Fig. 3 is a longitudinal vertical section through a rotary reduction furnace combined with an electric smelting furnace.

In Figs. 1 and 2 10 indicates generally the outside shell 11 the lining and 12 the shaft proper of the furnace. The briquettes are introduced into the shaft 12 through the feeding apparatus 15 applied with the known double closures 13 and 14. Round the lower part of the shaft there is arranged a circular room 16 forming a combustion chamber for the additional fuel supplied through the burners 17. From the combustion chamber 16 the combustion gases formed pass through the openings 18 in the wall of the shaft into the reducing space 12b of the shaft 12. Thereby the combustion gases surround the briquettes and deliver to same the heat required for the reduction. The carbon monoxide formed in the reduction by the carbon in the briquettes is also in part combusted in the interspaces between the briquettes in the shaft. In passing upwards through the shaft the combustion gases will, however, become enriched on combustible constituents which are utilized higher up in the shaft by supplying air through the openings 19 and 20, placed on different levels. The air is supplied to these openings through the pipes 21 and 22 from the ring-conduit 23 which is connected to a suitable pipe 40 for compressed air. The quantity of air supplied is controlled by the valves 24 and 25 on the pipes 21 and 22. The combustion gases being more strongly oxidizing after the addition of air are used for preheating the briquettes in the space 12a of the shaft and, in some cases, for pre-reducing same, whereafter they pass through the annular space 26 between the furnace wall and the feeding-apparatus 15 to the opening 27 and further to a suitable conduit or chimney, not shown on the drawings. The pressure of the gases in the furnace is controlled by regulating the pressure of the air and, if desired, the fuel to the burners 17 and the position of the damper 28 in the outlet 27.

The briquettes introduced through the feeding-apparatus 15 pass on their way through the shaft 12 first through a pre-heating zone 12a, which extends down to the openings 19, then through a reducing-zone 12b extending to somewhat below the openings 18, and enter thereafter a cooling-zone 12c, where the finally reduced sponge is cooled so that it can be discharged from the furnace without risk of re-oxidation at the contact with the open air. In the embodiment shown the cooling is effected by means of a doublewalled hopper 30 placed underneath the bottom plate 29 supporting the furnace walls. Air or water used as cooling agent in the interspaces between the walls enters said spaces through the pipe 41 and leaves same through the pipe 42. The sponge is discharged from the hopper 30 by means of screws 32 and 33 rotated by any suitable power means, not shown on the drawings.

In Fig. 3 that shows a plant with a rotary reduction furnace the briquettes are instead of being cooled directly transferred to an electric smelting furnace in which the final reduction and the melting of the sponge are performed. Of course, a special cooling apparatus, for instance of the rotary type, may be used instead of the electric furnace if cool sponge is to be produced. Parts of the plant corresponding to those of the shaft furnace according to Figs. 1 and 2 have the same reference numerals.

The briquettes are introduced into the preheating and pre-reduction zone 12a of the rotary furnace 12 through the feeding-apparatus 15, pass then through the reduction zone 12b, which part of the furnace is built with a larger diameter than the preceding section in order to prolong the time for the charge to pass through this section, and then through the outlet 51 in the end wall 50 of the furnace to a feeding-shaft 52 of the electric smelting furnace 53. Placed at the bottom of the shaft 52 there is one or more, preferably water-cooled, feeding screws 54 which introduce the sponge still containing some unreduced ore into the smelting chamber 55. Through another feeding shaft 56 with the closures 14a and 13a and screws 54a an ore-carbon-charge may, if desired, be introduced into the furnace to increase the development of reduction gas in same. The gas developed by the reduction in the furnace 53 is led off through the pipe 57 in the feeding shaft 56 to the burner 17 and burned with air supplied through the pipe 58 in the combustion chamber 16 at the end of the rotary reduction furnace. The flames and the combustion gases formed flow through the reduction zone 12b where they give off to the briquettes the heat necessary for the reduction, causing the ore to be reduced wholly or in part by the reducing agent contained in the briquettes. The gas developed in the reduction of the ore is partly combusted above the charge and within the interspaces between the briquettes in the chamber 12b by the oxidizing combustion gases from the combustion chamber 16. The gases pass then through the pre-reduction and pre-heating section 12a where a pre-reduction and pre-heating of the charge takes place. During the passage through the rotary furnace air may be supplied to the combustion gases through the air inlets 19 and 20. If compressed air is used the air is led to the ring-conduits 23 and 23a through a special pipe, not shown in the drawings. Thereafter the combustion gases pre-heat the briquettes in the last part of the zone 12a and are led off through the outlet 27 to a dust collecting chamber 59 and to a chimney 60 with the damper 28.

The invention is not limited to the materials or admixtures or products nor to the furnace arrangements which have hereinbefore been mentioned by way of example only, but comprises any production of metal sponge with the use of the process set forth.

What I claim as new and desire to secure by Letters Patent of the United States of America is:—

1. A process for producing metal sponge, consisting in mixing finely divided oxide ore and finely divided reducing agent, the latter in excess of the theoretical amount required for reduction, forming the mixture into briquettes, and reducing in a furnace the briquettes surrounded by an atmosphere containing combustion gases.

2. A process for producing metal sponge, consisting in mixing finely divided oxide ore and finely divided reducing agent including carbonaceous material, the latter in excess of the theoretical amount required for reduction, forming the mixture into briquettes, and reducing the briquettes in a furnace by means of heat given off by combustion gases in contact with the briquettes and of such oxidizing character as to burn part of the carbonaceous material in the briquettes, said gases developed through combustion with oxidizing gases of gas produced by reduction.

3. A process for producing metal sponge, consisting in mixing finely divided oxide ore and finely divided carbonaceous reducing material, the latter in excess of the theoretical amount required for reduction, forming the mixture into briquettes, and reducing the briquettes in a furnace by means of heat given off by combustion gases in contact with the briquettes and of such oxidizing character as to burn part of the carbonaceous material in the briquettes, said gases developed through combustion with oxidizing gases of additional fuel and of gas produced from said carbonaceous material.

4. A process for producing metal sponge, consisting in mixing finely divided oxide ore and finely divided carbonaceous reducing material, the latter in excess of the theoretical amount required for reduction, forming the mixture into briquettes, and reducing the briquettes in a furnace by means of heat given off by combustion gases in contact with the briquettes and of such oxidizing character as to burn part of the carbonaceous material in the briquettes, said gases developed through combustion with oxidizing gases of additional fuel and of gas produced from the carbonaceous material and of said carbonaceous material.

5. A process for producing metal sponge, consisting in mixing finely divided oxide ore and finely divided reducing agent, the latter in excess of the theoretical amount required for reduction, forming the mixture into briquettes, and reducing in a furnace the briquettes in an atmosphere containing combustion gases by the aid of heat, partly developed through combustion with air of fuel separately added to the furnace, and partly developed through combustion in the spaces between the briquettes of gas produced from the reducing agent.

6. A process for producing metal sponge, consisting in mixing finely divided oxide ore and finely divided reducing agent, the latter in excess of the theoretical amount required for reduction, forming the mixture into briquettes, and reducing the briquettes in a furnace by means of heat given off by combustion gases in contact with the briquettes and of such oxidizing character as to burn part of the reducing agent in the briquettes, said gases developed through combustion of fuel with air in a quantity less than the theoretical amount required for complete oxidation of the combustible elements of the fuel.

7. A process for producing metal sponge, consisting in mixing finely divided oxide ore and finely divided reducing agent, the latter in excess of the theoretical amount required for reduction, forming the mixture into briquettes, and reducing the briquettes in an atmosphere containing combustion gases in a reduction furnace, combined with a melting furnace, said gases being developed through combustion of gas produced in the reduction furnace and also of gas produced in the melting furnace by reduction of remaining non-reduced ore in the briquettes.

8. A process for producing metal sponge, consisting in mixing finely divided oxide ore and finely divided reducing agent, the latter in excess of the theoretical amount required for reduction, forming the mixture into briquettes, and reducing the briquettes by means of heat given off by combustion gases in contact with the briquettes in a reduction furnace, combined with a melting furnace, said gases being developed through combustion of gas produced in the reduction furnace and also of gas produced in the melting furnace by reduction both of remaining non-reduced ore in the briquettes and of a charge, separately fed in, containing oxide ore and reducing agent.

9. A process for producing metal sponge, consisting in mixing finely divided oxide ore and finely divided reducing agent, the latter in excess of the theoretical amount required for reduction, forming the mixture into briquettes, and reducing the briquettes in a reduction furnace by means of heat given off by combustion gases in contact with the briquettes, said gases being developed through combustion with oxidizing gases of gas obtained from an electric melting furnace, combined with said reduction furnace, in which melting furnace remaining non-reduced ore in the briquettes is reduced together with a charge, separately fed in, containing oxide ore and carbonaceous reducing agent, the latter in shortness of the theoretical amount required for reduction of the ore in said latter charge.

10. A process for producing metal sponge from briquettes containing finely divided oxide ore and finely divided reducing agent, the latter in excess of the theoretical amount required for reduction, said briquettes produced in such a way that the excess of the reducing agent is chiefly distributed to and on the surface layers of the briquettes, through reducing said briquettes in a furnace by means of heat given off by combustion gases in contact with the briquettes.

11. A process for producing metal sponge, consisting in mixing finely divided oxide ore and finely divided reducing agent in a quantity required for reduction, forming the mixture into briquettes, applying excessive reducing agent to the surfaces of the briquettes, and reducing the briquettes thus treated in a furnace by means of heat given off by combustion gases in contact with the briquettes.

12. A process for producing metal sponge, consisting in mixing finely divided oxide ore and finely divided reducing agent, the latter in excess of the theoretical amount required for reduction, forming the mixture into briquettes, reducing the briquettes in a reduction furnace by means of heat given off by combustion gases in contact with the briquettes, said gases developed through combustion with oxidizing gases of added fuel and of gas produced from the reducing agent, and controlling said combustion through adding air for combustion to the furnace successively in such way that the content of oxidizing constituents in the combustion gases is proportionate to the oxygen in the charge which the gases come in contact with.

13. A process for producing metal sponge, consisting in mixing finely divided oxide ore and finely divided reducing agent, the latter in excess of the theoretical amount required for complete reduction of the ore, forming the mixture into briquettes, and reducing the briquettes in a reduction furnace by means of heat given off by combustion gases in contact with the briquettes and of such oxidizing character as to burn part of the reducing agent in the briquettes, while increasing the action of the gases on the briquettes by moving the briquettes in opposite direction to said gases through the furnace.

14. A process for producing metal sponge, consisting in mixing finely divided oxide ore and finely divided reducing agent, the latter in excess of the theoretical amount required for reduction, forming the mixture into briquettes of a size $\frac{1}{12}$ inch to $\frac{1}{2}$ inch, and reducing the briquettes by means of heat given off by combustion gases in contact with the briquettes and of such oxidizing character as to burn part of the reducing agent in the briquettes, while keeping the briquettes in a rolling motion through the furnace to increase the action of the gases on the briquettes.

15. A process for producing metal sponge consisting in mixing finely divided oxide ore and finely divided reducing agent, the latter in excess of the theoretical amount required for reduction, forming the mixture into briquettes of a size $\frac{1}{2}$ inch to 6 inches and reducing a pile of the briquettes in a sinking motion in a furnace by means of heat given off by meeting combustion gases in contact with the briquettes and of such oxidizing character as to burn part of the reducing agent in the briquettes, said combustion gases being developed partly through combustion with air of fuel separately added to the furnace and partly through combustion in the spaces between the briquettes of gas produced from the briquettes.

16. A process for producing iron sponge, consisting in mixing finely divided iron oxide ore and finely divided carbonaceous reducing agent, the latter in excess of the theoretical amount required for reduction, forming the mixture into briquettes, and reducing the briquettes without fusing same in a furnace by means of heat given off by combustion gases in contact with the briquettes and of such oxidizing character as to burn part of the reducing agent in the briquettes.

17. A process for producing chrome-iron sponge consisting in mixing iron ore, chromite, carbonaceous reducing material and thermic reducing agent, all in a finely divided state, the total quantity of the reducing agents in excess of the theoretical amount required for reduction, forming the mixture into briquettes, and reducing the briquettes in a furnace by means of heat given off by combustion gases in contact with the briquettes.

EMIL GUSTAF TORVALD GUSTAFSSON.